United States Patent [19]

Hicks

[11] Patent Number: 5,193,968
[45] Date of Patent: Mar. 16, 1993

[54] PULL TRAILER DUMP TRUCK

[76] Inventor: W. Glenn Hicks, 809 Kennon, Minden, La. 71055

[21] Appl. No.: 480,226

[22] Filed: Feb. 15, 1990

[51] Int. Cl.⁵ .............................................. B60P 1/64
[52] U.S. Cl. .................................. 414/346; 414/477; 414/786
[58] Field of Search ............. 414/477, 478, 479, 480, 414/343, 345, 346, 786

[56] References Cited

U.S. PATENT DOCUMENTS

| | | | |
|---|---|---|---|
| 2,538,531 | 1/1951 | Likens | 410/72 |
| 2,849,129 | 8/1958 | Likens | 414/339 |
| 3,219,218 | 11/1965 | Hand | 414/345 X |
| 4,673,328 | 6/1987 | Shiels | 414/477 X |

FOREIGN PATENT DOCUMENTS 194954  9/1986  European Pat. Off. ............. 414/477

OTHER PUBLICATIONS

Servis-Likens Electric Transfer Dump Trucks-Operating Instructions.
Likens Electric Transfer Dump Trucks-Brochure.
Clement Industries Electric Transfer Dump Trucks-Operating Instructions.

Primary Examiner—F. J. Bartuska
Assistant Examiner—Janice Krizek
Attorney, Agent, or Firm—Richards, Medlock & Andrews

[57] ABSTRACT

A pull trailer dump truck assembly (10) is disclosed which uses a dump truck (12), a trailer (18) and an improved locking mechanism (24). The locking mechanism (24) includes at least one pair of cooperating locking wedges (54, 56) mounted on the trailer body (22) and the trailer frame (20) which move into wedging engagement when the trailer body is moved into the secured, traveling position on the trailer frame. A self-locking pintle hook (60) can be mounted on the frame to automatically lock with a pintle eye (58) as the wedge members move into wedging engagement to secure the trailer body (22) on the trailer frame (20). A power cylinder (66) can also be provided to move a locking wedge member (64) on the trailer frame and a locking wedge member (62) on the trailer body into locking wedged engagement.

10 Claims, 2 Drawing Sheets

PULL TRAILER DUMP TRUCK

TECHNICAL FIELD

This invention relates to a pull trailer, and specifically to a trailer mounted dump body.

BACKGROUND OF THE INVENTION

Construction materials, such as gravel and the like, are often carried by trucks on public highways from their source of supply to the location where the materials will be utilized. Clearly, it is in the best interests of efficiency to carry the largest load of materials possible each trip to minimize the number of round trips necessary and thus minimize both labor and equipment costs. However, most jurisdictions have weight limits or bridge laws which restrict the gross vehicle weight as a function of the number of axles and the distance, or bridge, between certain of the axles. Further, in a vehicle having a dump body, i.e. a dump truck, a dump body that is excessively long can be inconvenient, and even dangerous to tip up in the dumping operation because of the instability of the truck as the body is tilted into the dumping position.

One satisfactory solution to these factors is the pull trailer dump truck system. The concept of this system apparently originated with Mr. J. R. Likens and is disclosed in his U.S. Pat. No. 2,849,129 issued on Aug. 26, 1958. In concept, the system employs a conventional dump truck with a tilting dump. The dump body can be tilted about a pivot axis at the rear of the truck into a dumping position to dump the material contained therein. The system also includes a trailer which is trailed behind the dump truck. The trailer includes a frame and a trailer body. The trailer body is mounted on rollers on the frame. Both the body on the dump truck and body on the trailer are filled with material, such as gravel, at the supply source. Because of the number of axles and the length of the dump truck and trailer, a heavy load of material can be carried legally under most bridge laws. For example, an 80,000 lb gross vehicle weight can be achieved with such a system, with the useful load carrying capacity of the assembly approaching 52,000 lbs.

When the assembly reaches the site where the material is required, the trailer is disconnected from the dump truck and the dump truck proceeds to dump its load in the conventional manner. When the dump body is empty, the dump truck is backed against the front of the trailer and the dump truck and trailer are locked together. A latching mechanism is operated to release the body on the trailer and a mechanism is activated to draw the body physically into the dump body on the dump truck where it is secured in place. The dump truck can then be disconnected from the trailer and driven off to dump the load within the trailer body now secured within the dump truck body.

After the trailer body is empty, the dump truck is again backed up and secured to the trailer and the trailer body moved back onto the trailer and secured in place by the latching mechanism. In effect, the combination allows two dump truck body loads to be carried in a single trip. The system has the further advantage of allowing a shorter dump body to be used on the dump truck than would be required to dump an equal amount of material if both loads were in a single dump body, thus reducing the instability of the dump truck when the dump body is moved into the dumping position.

The system, however, does have several disadvantages relating to the latching mechanism. The latching mechanism is a pivoting hook mounted on the trailer which is manually moved into a preliminary engagement position with a bar on the body, assuming the body is properly positioned on the trailer. A power cylinder, such as an air cylinder, then completes the latching by pivoting the hook down onto the bar. However, this latching mechanism requires a multiple step operation and that the body be properly positioned on the trailer. An operator could operate the latching mechanism with the trailer out of position, thinking that the body was properly latched to the trailer, when it is not. Therefore, a need exists for an improved system to provide more effective and secure locking of the body to the trailer.

SUMMARY OF THE INVENTION

A trailer is provided for hauling materials which comprises a frame having a longitudinal axis and a body for holding material supported on the frame. A first wedge member is mounted on the frame and a second wedge member is mounted on the body. The body is movable relative to the frame along the longitudinal axis from a secured position. The first and second wedge members are engaged in the secured position and structure is provided on the frame and body to lock the body in the secured position in cooperation with the engaged wedge members.

In accordance with another aspect of the present invention, the locking structure is a pintle eye on the rear of the body and a self-locking pintle hook mounted on the frame which engage automatically when the body is moved into the secured position. In accordance with another embodiment of the present invention, a first locking wedge is mounted on the body and a second locking wedge is mounted on the trailer. Structure is provided for moving the locking wedges into a wedging configuration in the secured position to lock the body in the secured position.

BRIEF DESCRIPTION OF THE DRAWINGS

For a more complete understanding of the present invention and the advantages thereof, reference is now made to the following description taken in conjunction with the accompany drawings in which.

DETAILED DESCRIPTION

Figure 1:
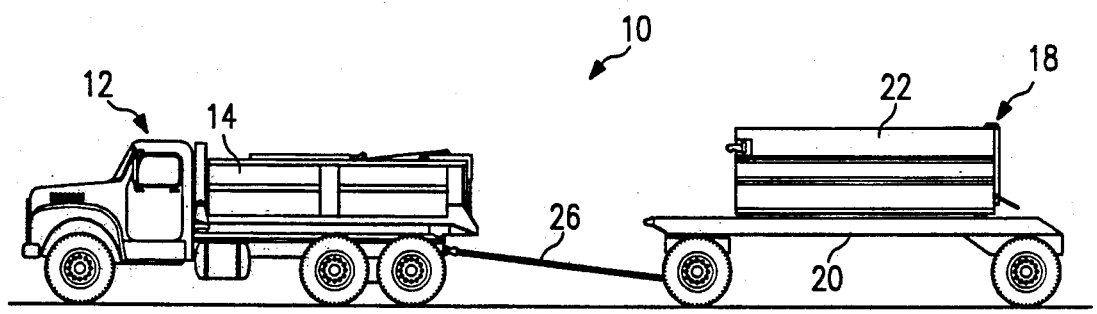
FIG. 1 is a side view of the dump truck and trailer and the transportation configuration.
Figure 2:
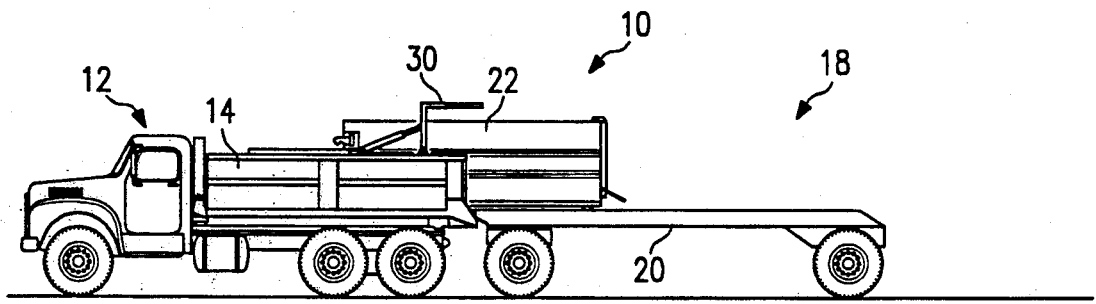
FIG. 2 is a side view of the dump truck and trailer secured together with the trailer body moving into the dump body.
Figure 3:
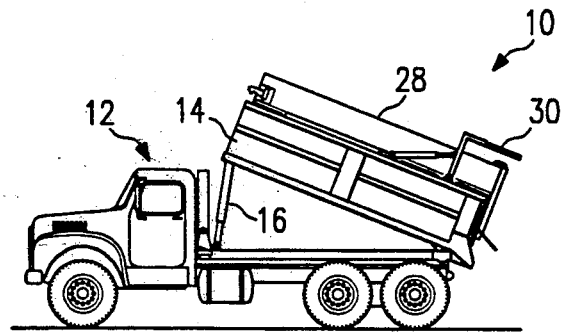
FIG. 3 is a side view of the dump truck with the trailer body load being dumped from the truck.

With reference now to the accompanying FIGURES, and specifically to FIGS. 1-3, a pull trailer dump truck assembly 10 forming a first embodiment of the present invention is illustrated. The assembly includes a dump truck 12 which has a dump body 14 pivotally mounted on the truck for pivotal motion from the lower, transportation position shown in FIGS. 1 and 2 toward a dumping position as illustrated in FIG. 3. The dump body is moved to the dumping position by a hydraulic cylinder 16, which is commonly made up of four telescoping sections with a 144 inch stroke. The assembly also includes a trailer 18 which includes a frame 20 and a trailer body 22. The trailer body 22 is locked onto the frame 20 by a locking mechanism 24 which will be discussed hereinafter when the trailer is in the transportation configuration.

As shown in FIG. 1, a drawbar 26 is mounted on the trailer 18 for connection to the dump truck 12 to trail trailer 18. The length of the drawbar 26 can be selected to maximize the legal carrying capacity of the assembly under the pertinent bridge laws in the jurisdictions in which the assembly will be used. As an example, the distance between the front axle of the dump truck and the rear axle of the trailer in the transportation configuration can be 55 ft. 6½ inches. The distance between the axles on the trailer is 214 inches. The distance between the front axle of the trailer and the point to which drawbar 26 attaches to the dump truck is 191½ inches. The distance between the front axle of the dump truck and the midpoint between the rear axles is 204 inches. The distance from the center of the rear axles to the point at which drawbar 26 mounts on the dump truck 12 is 57 inches. Both dump body 14 and trailer body 22 are 14 ft long.

When the assembly 10 reaches the location for dumping, the drawbar 26 is disconnected from the dump truck 12 and the dump truck is moved to the dumping location for dumping the material 28 contained within the dump body 14 by activating the hydraulic cylinder 16 to move the dump body into the dump position. After the dump body is emptied, the dump body is returned to the horizontal position and the dump truck returns to the trailer 18. The dump truck 12 is backed up over the drawbar 26 and against the front end of the trailer 18 where the front end of the trailer 18 and rear end of the dump truck 12 are locked together by a conventional mechanism which is not disclosed herein, but well understood to the industry.

Once the trailer 18 and dump truck 12 are locked together, the tailgate 30 of the dump body 14 is pivoted up away from the rear end of the dump body 14. The trailer body 22 is unlocked from the frame 20 with the locking mechanism 24 and a drive mechanism pulls the trailer body 22 forward along the frame 20 toward the dump body. As can best be seen in FIGS. 5 and 6, the trailer body is provided with a series of wheels 32 which facilitate the movement of the trailer body 22 along the frame 20.

The trailer body 22 is literally drawn into the dump body 14, as seen in FIGS. 2 and 3, and locked into place within the dump body by a locking mechanism. The dump truck 12 is then disconnected from the trailer 18 and the dump truck can be moved to dump the load of material 28 within the trailer body 22 in the same manner as the load was dumped from the dump body 14.

Figure 4:
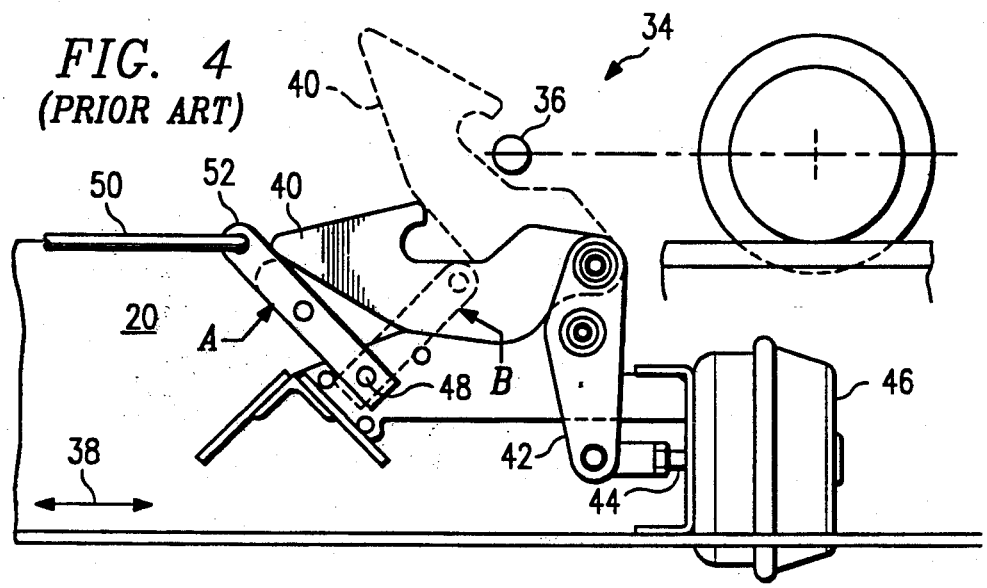
FIG. 4 is a side view of the prior art latching mechanism.

After the trailer body 22 is emptied, the dump truck 12 again returns to the frame 20 and is locked thereto to move the trailer body 22 back on to the frame 20. In prior known designs, a locking mechanism 34, as illustrated in FIG. 4, is employed to lock the trailer body 22 onto the trailer 18 for transport. This prior art locking mechanism 34 has a number of disadvantages as will be described with reference to FIG. 4.

As seen in FIG. 4, locking mechanism 34 includes a horizontally extending pin 36 which is mounted on the bottom of the trailer body 22. The pin extends perpendicular the longitudinal axis 38 of the frame 20 and the length of the trailer body 22. A hold-down hook 40 is pivotally mounted to one end of a pivot arm 42. Pivot arm 42 is, in turn, pivotally mounted near its center line to the frame 20. At the opposite end of the pivot arm 42 is pivotally mounted the end of a piston 44 forming part of a power cylinder 46 which is typically air pressure activated. A rod 48 is pivoted to the frame and mounts a first end of a lever arm 52 which can be moved into contact with the hold-down hook 40, and at its opposite end a handle 50 which extends exterior the frame for an operator to grasp.

As seen in FIG. 4, in position A, the handle 50 and arm 52 are positioned so that the hold-down hook lies horizontal well below the position of pin 36. In this position, the trailer body 22 can be either removed from the frame 20 or slid back onto the frame. When the trailer body is to be locked on the frame 20, the operator will move handle 50, rod 48 and arm 52 into position B where arm 52 bears against a portion of the hold-down hook 40 to position the hook above, and slightly forward on the trailer from the pin 36, assuming the trailer body has been properly positioned on the frame. The power cylinder 46 can then be activated to extend piston 44 which, because of the geometry of the pivot arm 42 and hold-down hook 40, draws the hold-down hook both downwardly and rearwardly relative to the trailer body to firmly engage the pin 36.

While locking mechanism 34 is generally effective, there exists certain shortcomings of this design. First, the operator must position the trailer body 22 on the frame 20 with great care to ensure that the pin 36 will be properly engaged by the hold-down hook 40. Secondly, a two step locking procedure must be undertaken in the proper sequence. Namely, the handle 50 must be properly moved to position B as shown in FIG. 4 and the power cylinder 46 subsequently activated to lock the hook on the pin. Finally, there is no external indication of proper latching of the trailer body and the operator could easily drive away with the trailer body not properly latched to the frame.

Figure 7:
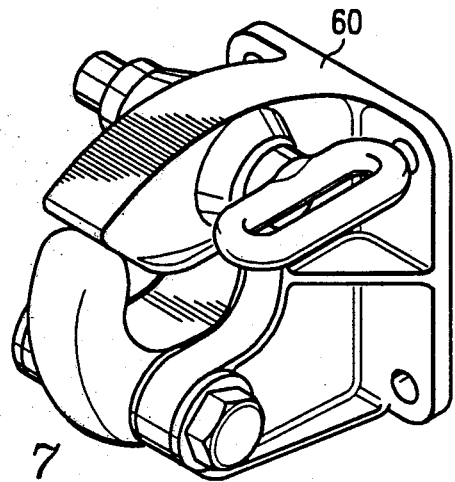
FIG. 7 is a perspective view of a self-locking pintle hook such as used in the invention.
Figure 5:
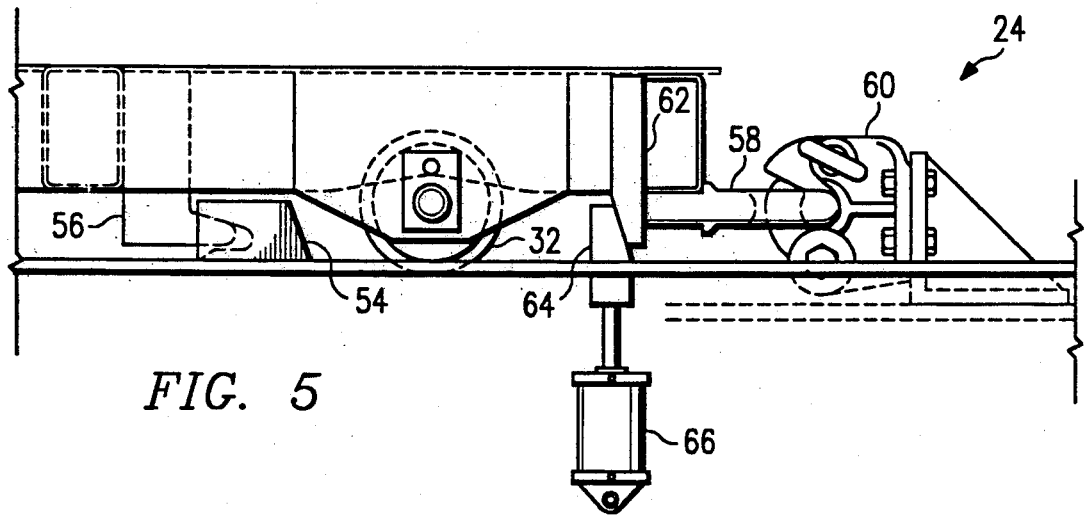
FIG. 5 is a side view of a trailer body, trailer frame and an improved locking mechanism which forms a first embodiment of the present invention.
Figure 6:
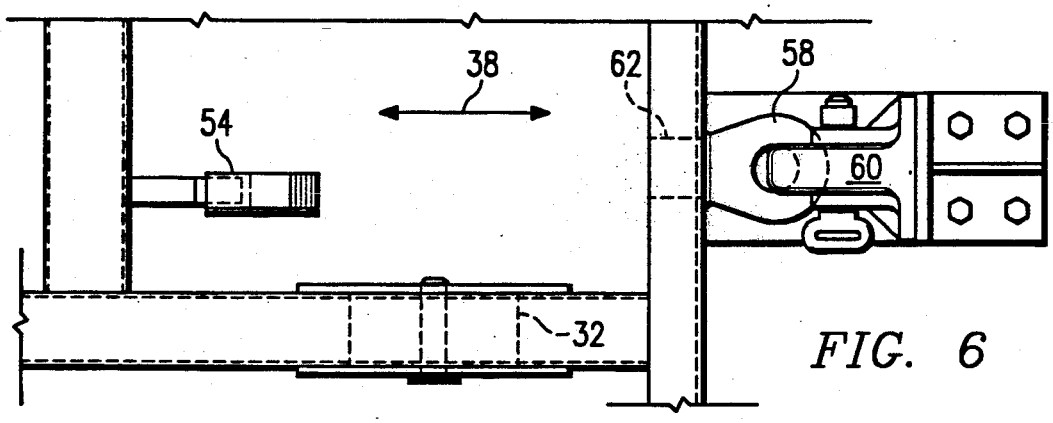
FIG. 6 is a top view of the body, frame and locking mechanism.

To overcome the disadvantages of the prior locking mechanism, the present invention includes an improved locking mechanism 24 which is best illustrated in FIGS. 5, 6 and 7. Locking mechanism 24 includes four female wedge members 54 mounted on the frame 20 generally at the location of each of the corners of the trailer body 22 in the secured positioned. Four male wedge members 56 are mounted on the underside of the trailer body 22 to engage the female wedge members 54 in the secured position. A pintle eye 58 is mounted at the rear of the trailer body 22. A self-locking pintle hook 60 is secured on the frame 20 rearward of the trailer body 22 when in the secured position. A locking wedge member 62 is mounted on the trailer body 22 near the pintle eye. A locking wedge member 64 is mounted on the frame 20 for vertical movement into and out of wedging engagement with the locking wedge member 62 with a power cylinder 66.

In operation, after the load in the trailer body has been dumped and the trailer body is again returned to frame 20, the trailer body 22 is simply moved rearward on the frame 20 to simultaneously engage each of the male wedge members 56 into the mating female wedge members 54 and automatically lock the pintle eye 58 into the self-locking pintle hook 60 to lock the trailer body 22 in the secured position. The power cylinder 66 can then be activated to move the locking wedge member 64 into wedging engagement with the locking wedge member 62 to provide a redundant lock mechanism to the pintle eye and hook. Power cylinder 66 can be activated automatically by movement of body 22 into the wedging position, as for example, body 22 hitting lever 67 on a valve 65 which activates cylinder 66. A locking pin 63 can be passed through the wedges 62 and 64 or wedge 64 and body 22 in the locked position to provide even another level of redundancy should cylinder 66 fail. The engaged wedge members 54 and 56 will prevent vertical and sideways movement of the trailer body 22, while the pintle eye and hook and locking wedging members prevent horizontal movement of the trailer body along the longitudinal axis of the frame 20.

To remove the trailer body 22 from the trailer frame 20, the power cylinder 66 is activated to move the locking wedge members 62 and 64 out of engagement and the self-locking pintle hook 60 is moved to its unlocking position so that the trailer body can be pulled off the frame 20. The pintle hook 60 automatically is reset to its spring loaded self-locking configuration when the pintle eye is withdrawn.

As can be readily understood, the use of four pairs of cooperating female and male wedge members 54 and 56 can be reduced to three pairs, two pairs, or even one pair of cooperating male and female wedge members, as desired, and the wedge members can be oriented or distributed between the frame and trailer body as desired. Further, the pintle eye 58 and hook 60 can be deleted and the locking feature achieved solely by use of the power cylinder 66 and cooperating locking wedge members 62 and 64. Alternatively, the locking wedge members 62 and 64 and power cylinder 66 can be deleted and the locking feature achieved solely by the pintle eye 58 and pintle hook 60.

As can be seen, the locking mechanism 24 has numerous advantages over the prior locking mechanism 34. The trailer body 22 can only be moved rearwardly to the point where the wedge members 54 and 56 engage, providing simple and error free positioning of the trailer body on the frame. Further, simply moving the trailer body into the secured position causes the pintle eye 58 to be engaged with self-locking pintle hook 60 to ensure that the trailer body is properly secured on the frame 20. The air cylinder provides a redundant automatic locking feature. Even if cylinder 66 is manually activated, if the operator forgets to activate it, the trailer body is still solidly fixed on the frame by the pintle eye and hook. In removing the trailer body 22, the self-locking pintle hook 60 automatically resets itself to a position to automatically lock back to the pintle eye 58 when the trailer body is reinstalled.

In accordance with one design constructed in accordance with the teachings of the present invention, a self-locking pintle hook made by Premier Manufacturing Company of 4434 Southeast 25th Avenue, Portland, Oreg. 97202 and identified as the Hitchmaster Coupling No. 690 forms the self-locking pintle hook 60. This pintle hook is paired with a two inch inner diameter eye.

Although a single embodiment of the invention has been illustrated in the accompanying drawings, and described in the foregoing Detailed Description, it will be understood that the invention is not limited to the embodiment disclosed, but is capable of numerous rearrangements, modifications and substitutions of parts and elements without departing from the scope and spirit of the invention.

I claim:

1. A dump truck pull trailer for hauling materials, the dump truck pull trailer having a trailer body to be moved into a tilting dump body on the dump truck, comprising:
    a frame having a longitudinal axis;
    a trailer body for holding materials, said trailer body supported on the frame for movement along the longitudinal axis of the frame between a secured position on the frame and a position substantially inside the dump body of the dump truck;
    a first wedge member mounted on the frame;
    a second wedge member mounted on the trailer body;
    the trailer body moveable relative to the frame along the longitudinal axis from the secured position, the first and second wedge members engaged in the secured position; and
    means mounted on the frame and trailer body to lock the trailer body to the frame in cooperation with the first and second wedge members in the secured position.

2. The trailer of claim 1 wherein said locking means includes a pintle eye mounted on the trailer body and a self-locking pintle hook mounted on the frame.

3. The trailer of claim 1 wherein said locking means comprises a first locking wedge mounted on the trailer body, a second locking wedge mounted on the frame and means for moving one of said locking wedges into a wedging engagement with the other of said locking wedges when the trailer body is in the secured position.

4. The trailer of claim 3 further comprising:
    a locking pin to lock the first and second locking wedges when said locking wedges are in wedging engagement.

5. The trailer of claim 1 wherein said locking means includes redundant locking mechanisms including a first locking mechanism having a pintle eye mounted on the trailer body and a self-locking pintle hook mounted on the frame, a second locking mechanism including a first locking wedge mounted on the trailer body and a second locking wedge mounted on the frame and means for moving said locking wedges into engagement when the trailer body is in the secured position.

6. The trailer of claim 1 wherein four sets of cooperating first and second wedge members are mounted on the frame and trailer body, wherein the second wedge members are proximate the corners of the trailer body.

7. A method for handling a trailer body of a dump truck pull trailer having a trailer frame, the trailer frame having a longitudinal axis, comprising the steps of:
    moving the trailer body in a first direction along the longitudinal axis relative to the trailer frame and to a position substantially inside a dump body of a dump truck;
    moving the trailer body in a second direction opposite to the first direction along the longitudinal axis to engage a first wedge member on the trailer body with a second wedge member on the trailer frame; and
    locking the trailer body on the trailer frame when the first wedge member engages the second wedge member.

8. The method of claim 7 wherein the step of locking the trailer body on the trailer frame further includes the steps of moving a pintle eye mounted on the trailer body into a self-actuating pintle hook mounted on the trailer frame as the first and second wedge members move into engagement.

9. The method of claim 7 wherein the step of locking the trailer body on the trailer frame includes the step of actuating a power cylinder to move a first locking wedge on the trailer frame into wedging engagement with a second locking wedge mounted on the trailer body.

10. A dump truck pull trailer for hauling materials, the dump truck pull trailer having a trailer body to be moved into a tilting dump body on a dump truck, comprising:

a frame for trailering behind the dump truck, the frame having a longitudinal axis;

a trailer body movable along the longitudinal axis of the frame between a secured position on the frame and a position substantially inside the dump body of the dump truck for dumping a load hauled in the trailer body;

a first wedge member mounted on the frame;

a second wedge member mounted on the trailer body;

the first and second wedge members engaging as the trailer body is moved into the secured position on the frame;

means mounted on the frame and trailer body to lock the trailer body to the frame in cooperation with the first and second wedge members when the trailer body is in the secured position.

* * * * *

UNITED STATES PATENT AND TRADEMARK OFFICE
CERTIFICATE OF CORRECTION

PATENT NO. : 5,193,968
DATED : March 16, 1993
INVENTOR(S) : W. Glen Hicks

It is certified that error appears in the above-indentified patent and that said Letters Patent is hereby corrected as shown below:

On title page, item [76] Inventor: change "Glenn" to --Glen--.

Signed and Sealed this

Tenth Day of September, 1996

Attest:

BRUCE LEHMAN

*Attesting Officer*  *Commissioner of Patents and Trademarks*